(12) United States Patent
Morita

(10) Patent No.: US 9,420,223 B2
(45) Date of Patent: Aug. 16, 2016

(54) IMAGE RECORDING DEVICE THAT RECORDS MOVING IMAGE, METHOD OF CONTROLLING THE SAME, AND STORAGE MEDIUM

(71) Applicant: CANON KABUSHIKI KAISHA, Tokyo (JP)

(72) Inventor: Masahiko Morita, Akiruno (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/623,412

(22) Filed: Sep. 20, 2012

(65) Prior Publication Data

US 2013/0076935 A1    Mar. 28, 2013

(30) Foreign Application Priority Data

Sep. 26, 2011  (JP) ................................ 2011-209002

(51) Int. Cl.
  *H04N 7/00*       (2011.01)
  *H04N 5/232*      (2006.01)
  *H04N 5/235*      (2006.01)

(52) U.S. Cl.
  CPC ............... *H04N 7/00* (2013.01); *H04N 5/2355* (2013.01); *H04N 5/23229* (2013.01)

(58) Field of Classification Search
  CPC .................................................. H04N 5/2352
  USPC ...................................... 348/229.1
  See application file for complete search history.

(56) References Cited

U.S. PATENT DOCUMENTS

| | | | | |
|---|---|---|---|---|
| 6,587,149 | B1* | 7/2003 | Yoneyama | H04N 5/235 348/229.1 |
| 8,334,498 | B2* | 12/2012 | Kanbe | H01L 27/14609 250/208.1 |
| 2002/0145674 | A1* | 10/2002 | Nakamura | H04N 5/235 348/296 |
| 2003/0016189 | A1* | 1/2003 | Abe et al. | 345/55 |
| 2004/0165091 | A1* | 8/2004 | Takemura et al. | 348/296 |
| 2006/0050171 | A1* | 3/2006 | Lee | 348/362 |
| 2008/0089473 | A1* | 4/2008 | Sakata | A61B 6/505 378/39 |

(Continued)

FOREIGN PATENT DOCUMENTS

| | | |
|---|---|---|
| JP | H05-30424 | 2/1993 |
| JP | 2004-363666 A | 12/2004 |
| JP | 2009-027622 A | 2/2009 |

OTHER PUBLICATIONS

Japanese Office Action issued in corresponding application No. JP2011-209002 dated Sep. 8, 2015.

*Primary Examiner* — Roberto Velez
*Assistant Examiner* — Cynthia Segura
(74) *Attorney, Agent, or Firm* — Carter, DeLuca, Farrell & Schmidt, LLP

(57) ABSTRACT

An image recording device capable of obtaining a moving image with less noise even in a low illuminance environment when obtaining a moving image having a wide dynamic range. An image pickup device picks up an image of an object over different exposure time periods to output a plurality of image signals. The plurality of image signals output from the image pickup device are synthesized to thereby obtain a synthesized image. The synthesized image is recorded in a memory at a predetermined frame rate. Respective vertical transfer periods for reading out the plurality of image signals are differentiated according to the different exposure time periods, and the sum of the vertical transfer periods is controlled to a time period defined by the predetermined frame rate.

7 Claims, 13 Drawing Sheets

(56) References Cited

U.S. PATENT DOCUMENTS

| | | | |
|---|---|---|---|
| 2008/0239089 A1* | 10/2008 | Ikeyama | H04N 5/232 348/222.1 |
| 2011/0188765 A1* | 8/2011 | Fukuhara | G06K 9/36 382/233 |
| 2011/0242368 A1* | 10/2011 | Haneda | H04N 5/235 348/239 |

* cited by examiner

*FIG. 3*

| LUMINANCE LEVEL | PROPER RATIO | UNDER RATIO | OVER RATIO |
|---|---|---|---|
| 0 | 0 | 0 | 1 |
| 1 | 0.1 | 0 | 0.9 |
| : | | | |
| : | | | |
| : | | | |
| 1022 | 0.32 | 0.68 | 0 |
| 1023 | 0.3 | 0.7 | 0 |

# IMAGE RECORDING DEVICE THAT RECORDS MOVING IMAGE, METHOD OF CONTROLLING THE SAME, AND STORAGE MEDIUM

BACKGROUND OF THE INVENTION

1. Field of the Invention

The present invention relates to an image recording device that records a moving image, a method of controlling the image recording device, and a storage medium.

2. Description of the Related Art

In recent years, an image recording device of a digital camera or the like is equipped with a function of shooting and recording a moving image with sound. In such an image device, in shooting and recording a moving image, the moving image is recorded using the frame rate of an image pickup device, i.e. a frame rate during shooting, as a recording frame rate.

The image recording device is further equipped with a function of recording a moving image at a low frame rate, which has been picked up at a high frame rate, and performing slow-motion reproduction of the best moment of the moving image. Further, there is an image recording device that synthesizes and records outputs from a plurality of image pickup devices.

For example, there has been proposed an image recording device that synthesizes image signals output from a plurality of image pickup devices while making the accumulation time period different from each other, into a single image signal to thereby obtain a moving image having a wide dynamic range (see Japanese Patent Laid-Open Publication No. H05-30424).

However, in the image recording device described in Japanese Patent Laid-Open Publication No. H05-30424, the accumulation time period of an image pickup apparatus is limited according to an image pickup frame rate. For this reason, an image picked up at a low illuminance may be darker than expected, and as a result, a desired dynamic range sometimes cannot be obtained.

Further, if a picked-up image is multiplied by a gain to increase the dynamic range, noise is sometimes emphasized in the picked-up image.

SUMMARY OF THE INVENTION

The present invention provides an image recording device capable of obtaining a moving image with less noise even in a low illuminance environment when obtaining a moving image having a wide dynamic range, a method of controlling the image recording device, and a storage medium.

In a first aspect of the present invention, there is provided an image recording device comprising an image pickup unit configured to pick up an image of an object over different exposure time periods to output a plurality of image signals, an image synthesis unit configured to synthesize the plurality of image signals output from the image pickup unit to thereby obtain a synthesized image, a recording unit configured to record the synthesized image in a memory at a predetermined frame rate, and a control unit configured to differentiate respective vertical transfer periods for reading out the plurality of image signals from the image pickup unit according to the different exposure time periods, and control the sum of the vertical transfer periods to a time defined by the predetermined frame rate.

In a second aspect of the present invention, there is provided a method of controlling an image recording device including an image pickup unit that outputs an image signal corresponding to an optical image, and a memory that records an image, comprising causing the image pickup unit to pick up an image of an object over different exposure time periods to thereby output the plurality of image signals, synthesizing a plurality of image signals output from the image pickup unit to thereby obtain a synthesized image, recording the synthesized image in the memory at a predetermined frame rate, and differentiating respective vertical transfer periods for reading out the plurality of image signals according to the different exposure time periods, and controlling the sum of the vertical transfer periods to a time period defined by the predetermined frame rate.

In a third aspect of the present invention, there is provided a non-transitory computer-readable storage medium storing a computer-executable program for causing a computer to execute a method of controlling an image recording device including an image pickup unit that outputs an image signal corresponding to an optical image, and a memory that records an image, wherein the method comprises causing the image pickup unit to pick up an image of an object over different exposure time periods to thereby output the plurality of image signals, synthesizing a plurality of image signals output from the image pickup unit to thereby obtain a synthesized image, recording the synthesized image in the memory at a predetermined frame rate, and differentiating respective vertical transfer periods for reading out the plurality of image signals according to the different exposure time periods, and controlling the sum of the vertical transfer periods to a time period defined by the predetermined frame rate.

According to the present invention, it is possible to obtain a moving image having a wide dynamic range with less noise even in a low illuminance environment.

Further features of the present invention will become apparent from the following description of exemplary embodiments with reference to the attached drawings.

BRIEF DESCRIPTION OF THE DRAWINGS

FIG. 3 is a diagram showing an example of a synthesis ratio table appearing in FIG. 2.

DESCRIPTION OF THE EMBODIMENTS

The present invention will now be described in detail below with reference to the accompanying drawings showing embodiments thereof.

Figure 1:
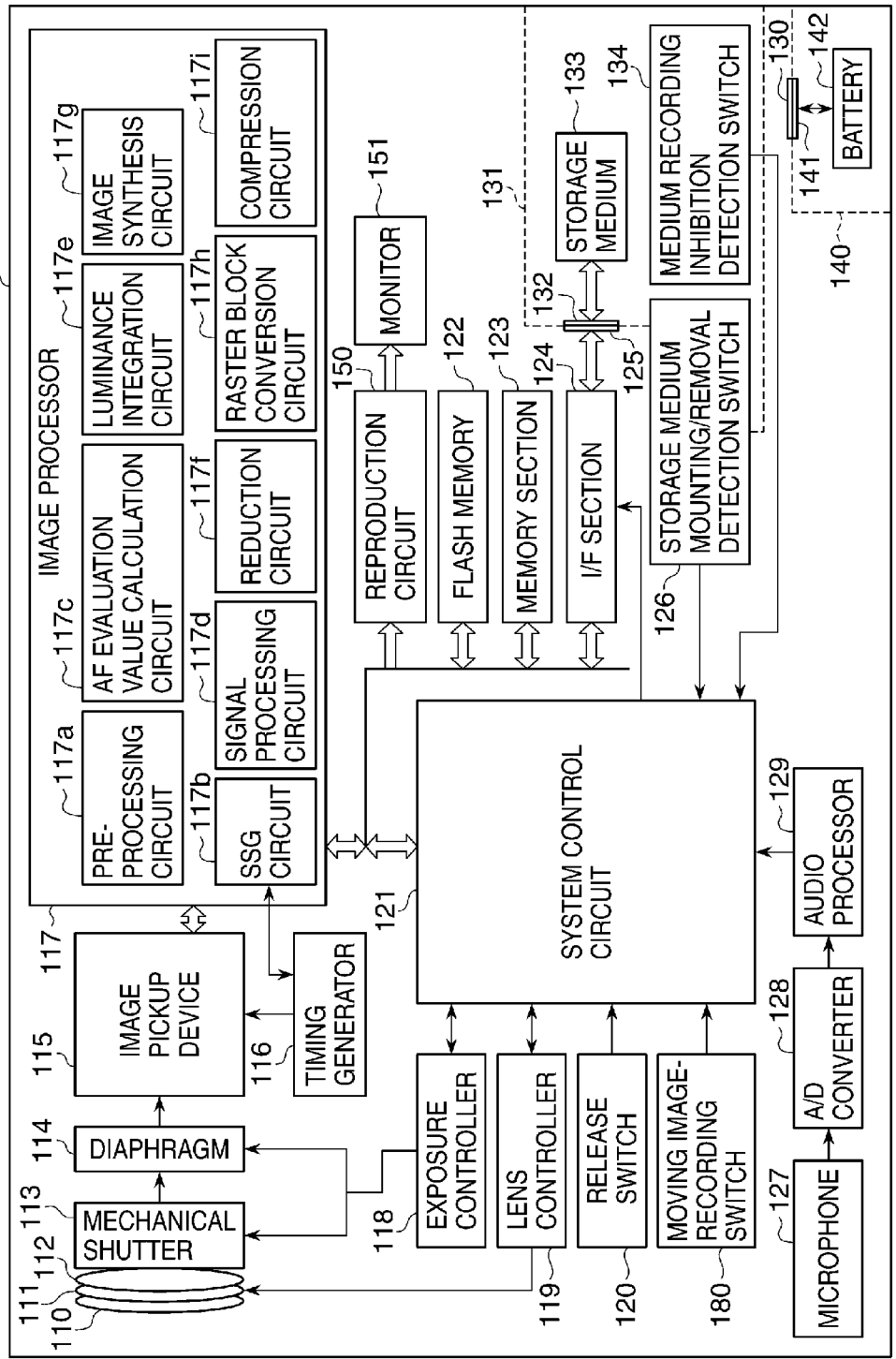
FIG. 1 is a block diagram of a camera as an image pickup apparatus including an image recording device according to a first embodiment of the present invention.

FIG. 1 is a block diagram showing an example of an image pickup apparatus including an image recording device according to a first embodiment of the present invention.

In FIG. 1, the illustrated image pickup apparatus is e.g. a digital camera (hereinafter simply referred to as the camera) 100, which includes a zoom lens 110. A shift lens 111 for correcting shake, a focus adjustment lens 112, a mechanical shutter 113, and a diaphragm 114 are disposed downstream of the zoom lens 110. An optical image of an object passing through the diaphragm 114 is formed as an image on a solid image pickup device (hereinafter simply referred to as the image pickup device) 115 (e.g. a CCD).

The image pickup device 115 includes a plurality of pixels arranged in a two-dimensional matrix. That is, the image pickup device 115 includes the plurality of pixels arranged in rows and columns. The image pickup device 115 is driven in accordance with a timing pulse output from a timing generator 116 to output an electric signal (analog signal) according to an optical image. Then, the analog signal is provided to an image processor 117.

The image processor 117 includes a pre-processing circuit 117a, an SSG circuit (horizontal/vertical synchronization signal generation circuit) 117b, an AF (auto focus) evaluation value calculation circuit 117c, a signal processing circuit 117d, a luminance integration circuit 117e, a reduction circuit 117f, an image synthesis circuit 117g, a raster block conversion circuit 117h, and a compression circuit 117i.

The SSG circuit 117b receives a clock signal for image pickup driving from the timing generator 116, and provides horizontal and vertical synchronization signals to the timing generator 116 and the image pickup device 115. Note that the term "image pickup driving" is intended to mean "driving the camera 100, particularly the image pickup device 115, for image pickup".

The pre-processing circuit 117a converts an analog signal as an output from the image pickup device 115 to a digital signal (also referred to as the image signal), and distributes the image signal to the luminance integration circuit 117e and the signal processing circuit 117d on a row-by-row-basis. The pre-processing circuit 117a further performs processing e.g. for correcting data between channels.

The AF evaluation value calculation circuit 117c performs filtering processing in a horizontal direction on a luminance component of each image signal in a plurality of evaluation areas set in advance. Further, the AF evaluation value calculation circuit 117c selects a maximum value of contrast while extracting a predetermined frequency indicative of contrast, and performs integral calculation in a vertical direction.

The luminance integration circuit 117e divides the image signal composed of RGB (red, green, blue) signals input thereto into a plurality of regions, and a signal level is integrated for each of four pixels (RGGB contained in a Bayer array of 2×2 pixels) Then, a CPU, referred to hereinafter, reads out a result of integration for each color, on a divisional region-by-divisional region basis, multiplies the result of integration for each color by a predetermined coefficient, and adds up the results to thereby generate a luminance component for each divisional region.

The signal processing circuit 117d performs processing for color carrier removal, aperture correction, and gamma correction, on each image signal to generate a luminance signal. Further, the signal processing circuit 117d performs color interpolation, matrix conversion, gamma processing, and gain adjustment on each image signal to generate color difference signals. Further, the signal processing circuit 117d records image data in the YUV format in a memory section 123.

Note that Y represents the luminance signal, and U represents a difference between the luminance signal and a blue component. Further, V represents a difference between the luminance signal and a red component. Further, the signal processing circuit 117d counts the luminance signals (Y) for each level in the image data in the YUV format to generate luminance distribution data for each image data item.

The image synthesis circuit 117g multiplies image data stored in the memory section 123 or a plurality of image data items in the YUV format generated by the signal processing circuit 117d by respective coefficients set on a pixel basis, and adds up the obtained image data items to generate synthesized image data. Note that synthesis processing performed by the image synthesis circuit 117g will be described in detail hereinafter.

The reduction circuit 117f receives image data from the signal processing circuit, and performs processing for clipping and thinning the pixel data, and linear interpolation processing to thereby perform processing for reducing the image data in the horizontal and vertical directions. The raster block conversion circuit 117h converts raster scan image data subjected to magnification/reduction by the reduction circuit 117f to block scan image data.

In the above-described sequence of image processing operations, the memory section 123 is used as a buffer memory, and the compression circuit 117i compresses the image data in the YUV format which has been converted to the block scan data, according to a moving image compression method, and outputs the compressed image data as a moving image bit stream.

The camera 100 includes an exposure controller 118. The exposure controller 118 controls the mechanical shutter 113 and the diaphragm 114. A lens controller 119 moves the zoom lens 110 and the focus adjustment lens 112 along an optical axis, to thereby cause an optical image to be formed on the image pickup device 115 as an image.

Further, the lens controller 119 drives the shift lens 111 according to outputs from an angular velocity sensor and an acceleration sensor (neither of which is shown) to thereby optically correct a camera shake.

A system control circuit 121 has a release switch 120 connected thereto, and a shooing instruction is issued to the system control circuit 121 by the operation of the release switch 120. Input sound is converted to an audio signal by a microphone 127, and the audio signal is converted to a digital audio signal by an analog-to-digital converter 128. Then, the digital audio signal is subjected to predetermined audio processing by an audio processor 129, and then is provided to the system control circuit 121 as an audio bit stream.

The system control circuit 121 controls the overall operation of the camera 100. The system control circuit 121 includes the CPU (central processing unit), an interface circuit, a DMAC (direct memory access controller), a bus arbiter, and so on, and the CPU executes control programs stored in a flash memory 122.

A battery box 140 accommodates a battery 142, and the battery 142 is connected to the camera 100 via connection terminals 130 and 141. A storage medium-accommodating section 131 accommodates a storage medium 133. The storage medium 133 stores image data, and is connected via an interface section 124 to the camera 100 by connection terminals 125 and 132.

A medium recording inhibition detection switch 134 and a storage medium mounting/removal detection switch 126 are connected to the system control circuit 121. When write-inhibition with respect to the storage medium 133 is detected by the medium recording inhibition detection switch 134, the system control circuit 121 inhibits recording of image data in the storage medium 133.

Further, the system control circuit 121 recognizes mounting or removal of the storage medium 133 by the storage medium mounting/removal detection switch 126. In the present embodiment, when the storage medium 133 is removed from the storage medium-accommodating section 131, the storage medium mounting/removal detection switch 126 is switched off.

On the other hand, when the storage medium 133 is inserted in the storage medium-accommodating section 131, the storage medium mounting/removal detection switch 126 is switched on. Note that recording of a moving image is instructed to the system control circuit 121 by a moving image-recording switch 180.

A reproduction circuit 150 converts image data stored in the memory section 123 to display image data, and transfers the display image data to a monitor (display device) 151 as a display image. Then, the display image is displayed on the monitor 151.

The reproduction circuit 150 separates image data in the YUV format into a luminance signal Y and a modulated color difference component C, and then converts the luminance signal Y from digital to analog. Then, the reproduction circuit 150 performs low-pass filtering processing (LPF processing) on the analog luminance signal.

Further, the reproduction circuit 150 converts the modulated color difference component C from digital to analog, and performs bandpass filtering processing (BPF processing) on the analog modulated color difference component C to extract only a frequency component. Then, the reproduction circuit 150 generates a luminance signal Y and an RGB signal based on a signal component and a subcarrier frequency, and outputs the generated luminance signal Y and RGB signal to the monitor 151 as display image data.

As described above, by sequentially processing image data by the reproduction circuit 150 and displaying the image data on the monitor 151, it is possible to use the monitor 151 as an electronic viewfinder (EVF).

Figure 2:
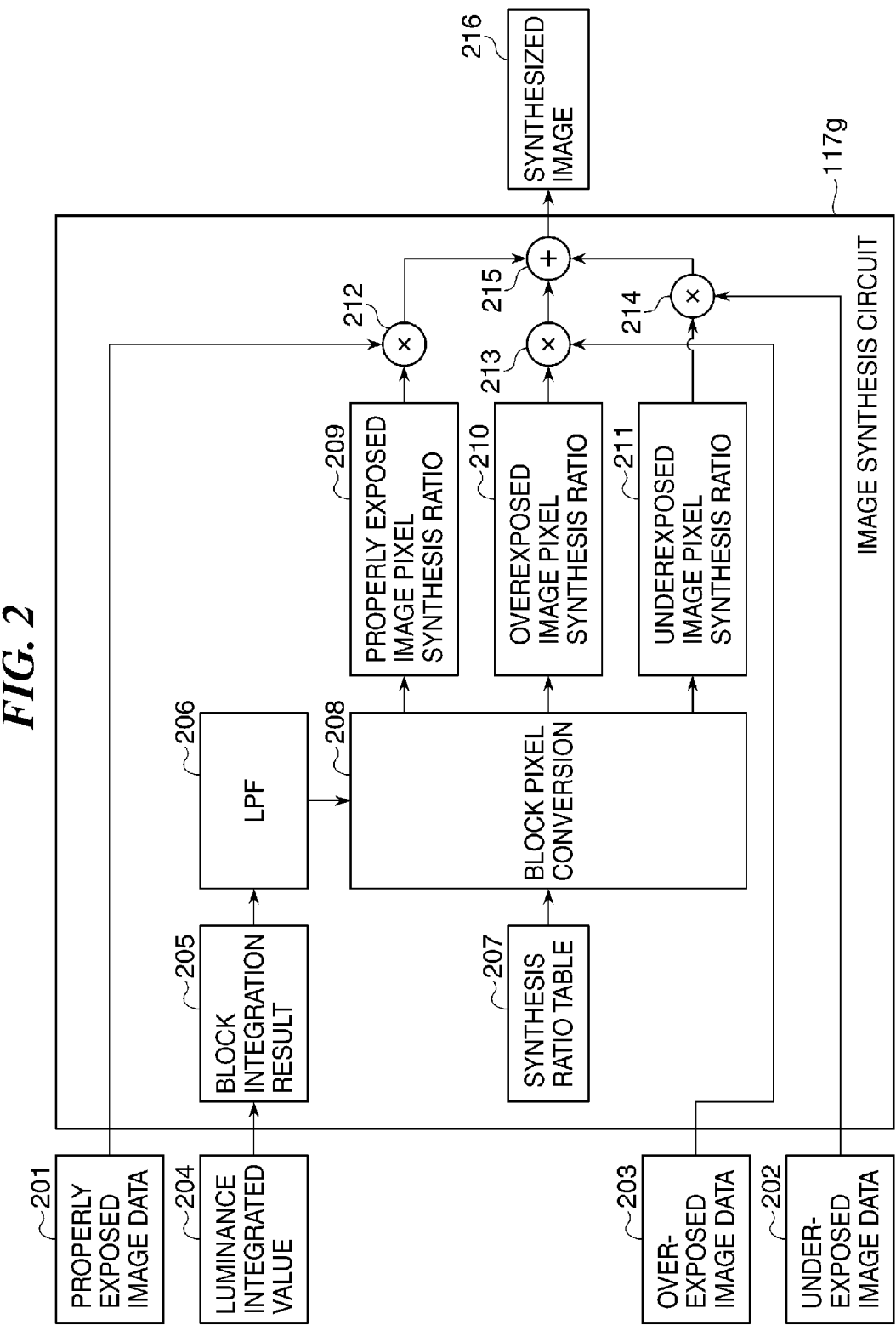
FIG. 2 is a diagram useful in explaining image synthesis processing performed by an image synthesis circuit appearing in FIG. 1.

FIG. 2 is a diagram useful in explaining image synthesis processing performed by the image synthesis circuit appearing in FIG. 1.

Properly exposed image data 201, underexposed image data 202, overexposed image data 203 are input to the image synthesis circuit 117g as image data. Note that in the following description, image data is sometimes simply referred to as an image.

Here, a properly exposed image is an image obtained by shooting at a proper exposure level under a shooting environment. An underexposed image is an image obtained by shooting at an exposure level lower than the proper exposure level. Further, an overexposed image is an image obtained by shooting at an exposure level higher than the proper exposure level.

Further, a luminance integrated value 204 obtained by integrating a luminance component generated for each region (hereinafter also referred to as each block) with respect to the properly exposed image in the luminance integration circuit 117e is provided to the image synthesis circuit 117g as a block integration result 205. Then, the image synthesis circuit 117g performs low-pass filtering 206 on the block integration result 205 in the horizontal and vertical directions to form low-pass filtered data.

A synthesis ratio table 207 stores a synthesis ratio coefficient indicative of a synthesis ratio between a properly exposed image, an underexposed image, and an overexposed image.

FIG. 3 is a diagram showing an example of the synthesis ratio table appearing in FIG. 2.

As shown in FIG. 3, the synthesis ratio table defines a properly exposed image ratio (proper ratio), an underexposed image ratio (under ratio), and an overexposed image ratio (over ratio) as coefficients in association with a luminance level. In the illustrated example, the respective ratios of the properly exposed image, the underexposed image, and the overexposed image are set such that the sum of the ratios for each pixel becomes equal to 1.

Note that the respective ratios may be set such that the sum of the ratios for each pixel exceeds 1 according to luminance of field (luminance of an object).

The image synthesis circuit 117g performs block pixel conversion processing 208 on the LPF data. Here, the image synthesis circuit 117g refers to the synthesis ratio table according to the luminance value level in the LPF data, and determines a ratio between the properly exposed image, the underexposed image, and the overexposed image (i.e. coefficients), on a pixel-by-pixel basis.

Then, the image synthesis circuit 117g obtains a properly exposed image pixel synthesis ratio 209, an overexposed image pixel synthesis ratio 210, and an underexposed image pixel synthesis ratio 211.

In the illustrated example, the overexposure is higher in exposure than the proper exposure by 1.5 steps, and the underexposure is lower in exposure than the proper exposure by 1.5 steps.

Subsequently, the image synthesis circuit 117g multiplies the properly exposed image data 201 by the properly exposed image pixel synthesis ratio 209 on a pixel basis using a multiplier 212 to thereby form a corrected properly exposed image. Similarly, the image synthesis circuit 117g multiplies the overexposed image data 203 by the overexposed image pixel synthesis ratio 210 on a pixel basis using a multiplier 213 to thereby form a corrected overexposed image.

Further, the image synthesis circuit 117g multiplies the underexposed image data 202 by the underexposed image pixel synthesis ratio 211 on a pixel basis using a multiplier 214 to thereby form a corrected underexposed image.

Next, the image synthesis circuit 117g adds the corrected properly exposed image, the corrected overexposed image, and the corrected underexposed image using an adder 215, and outputs the added images as a synthesized image 216.

Figure 4:
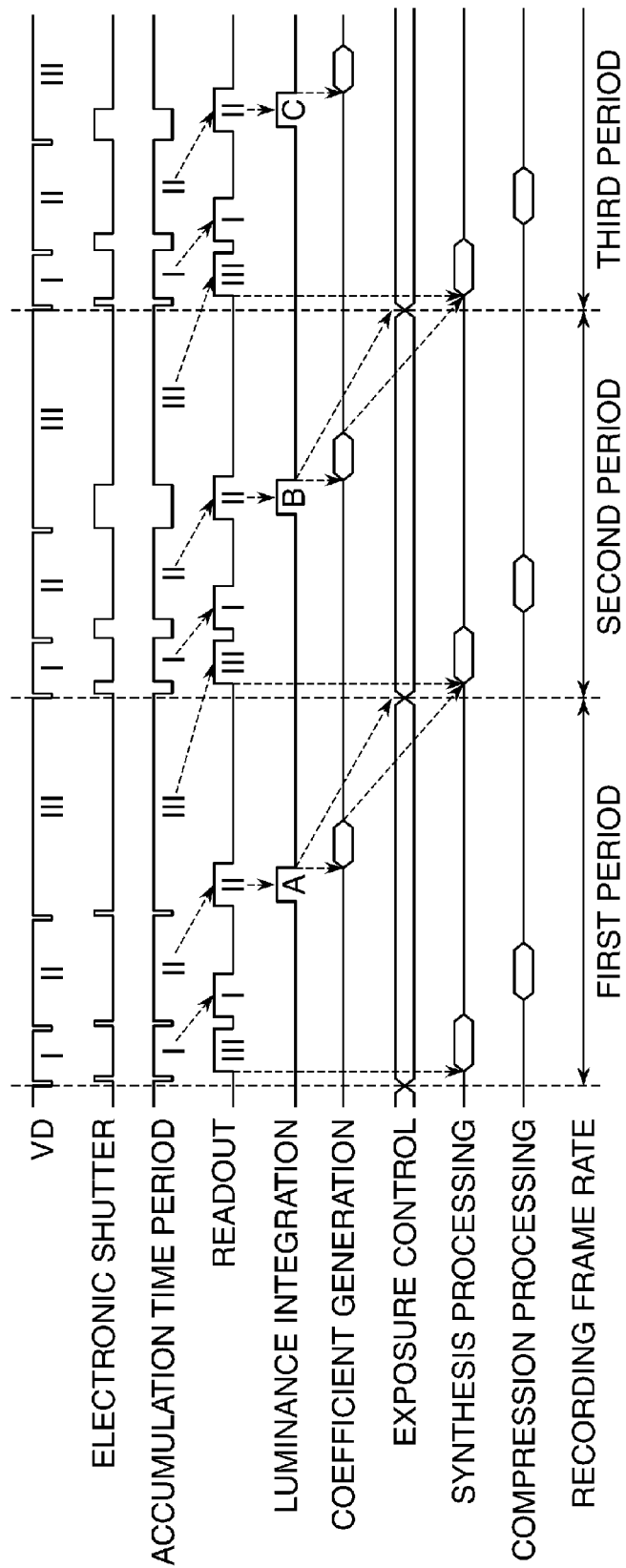
FIG. 4 is a timing diagram of image synthesis processing performed by the camera shown in FIG. 1.

FIG. 4 is a timing diagram of image synthesis processing performed by the camera 100 shown in FIG. 1.

In the example shown in FIG. 4, a shortest vertical period (vertical transfer period) for driving the image pickup device 115 is determined based on readout speed (i.e. readout time) of the image pickup device 115. It is assumed that the readout speed of the image pickup device 115 is sufficiently higher than a recording frame rate of a moving image.

Here, to increase the dynamic range of the image pickup device 115, first to third vertical periods I to III are set as vertical periods for image pickup driving. Then, the image pickup device 115 is periodically driven over each of the first to third vertical transfer periods I to III as one unit. At this time, the sum of the first to third vertical periods I to III is set as the recording frame rate of the moving image.

The maximum accumulation time period in each of the first to third vertical periods I to III approximately corresponds to the vertical period. This makes it possible to obtain images which are different in accumulation time period from each other by making the first to third vertical periods I to III different from each other. Note that the vertical period is intended to mean a scanning period in the column direction of the image pickup device 115.

In FIG. 4, an electronic shutter is operated according to a vertical synchronization signal VD. In the illustrated example, an accumulation time period (charge accumulation time period) corresponding to the first vertical period I is referred to as a first accumulation time period I, and an accumulation time period corresponding to the second vertical period II is referred to as a second accumulation time period II. Further, an accumulation time period corresponding to the third vertical period III is referred to as a third accumulation time period III.

Note that I<II<III holds. Further, as for an accumulation time period shorter than the maximum accumulation time period, a charge accumulated in the image pickup device 115 is discharged by the electronic shutter.

First, in a first period defined by a time period corresponding to the recording frame rate, during the first vertical period I in which the accumulation time period is the shortest, exposure (i.e. exposure time) is controlled such that the exposure level of bright part of field (object) becomes close to the proper exposure level. During the second vertical period II in which the accumulation time period is intermediate, exposure is controlled such that the exposure level of medium bright part of the field is equal to the proper exposure level. Further, in the third vertical period III in which the accumulation time period is the longest, exposure is controlled such that the exposure level of dark part of field becomes close to the proper exposure level. Thus, the exposure time is differentiated for each vertical period.

Charges (accumulated charges) accumulated in the image pickup device 115 in the first to third vertical period I to III are read out during the next respective vertical periods as the image signals (analog signals). Then, the underexposed image and the properly exposed image read out from the image pickup device 115 are converted to YUV signals by the signal processing circuit 117d as described above, and are stored in the memory section 123.

On the other hand, the luminance integration circuit 117e reads the properly exposed image read out during the second vertical period II, and generates a block integration result A as described above. Therefore, during the third vertical period III, processing for writing the properly exposed image in the memory section 123 and luminance integration processing by the luminance integration circuit 117e are executed.

Then, an exposure control value for the following period is calculated according to the block integration result A, and determination of the synthesis ratios is performed as described above (generation of coefficients).

When the synthesis ratios (coefficients) are determined, the overexposed image accumulated in the third vertical period III is read out during the first vertical period I in the second period. During the first vertical period I in the second period, the signal processing circuit 117d reads out the underexposed image and the properly exposed image stored in the memory section 123, and provides the read images to the image synthesis circuit 117g in synchronism with inputting of the overexposed image converted to the image data in the YUV format.

Further, in the second period, the image synthesis circuit 117g outputs an image synthesized as described above, while performing synchronization on a pixel basis. Thereafter, compression processing is executed by the compression circuit 117i. As described above, the image synthesis is sequentially performed in each of the first to third periods each corresponding to the recording frame rate.

Figure 5:
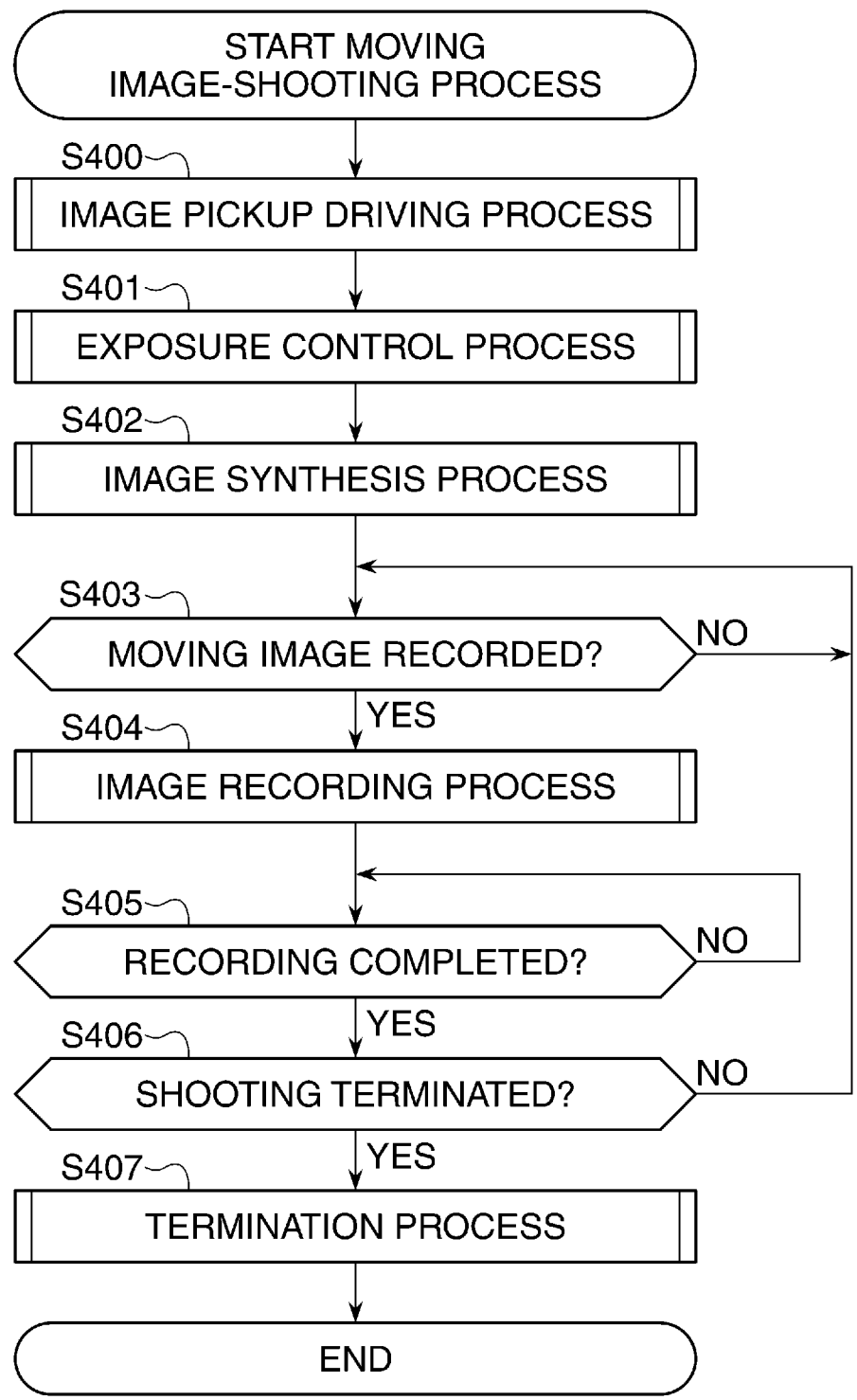
FIG. 5 is a flowchart of a moving image-shooting process performed by the camera shown in FIG. 1.

FIG. 5 is a flowchart of a moving image-shooting process performed by the camera 100 shown in FIG. 1. The flowchart shown in FIG. 5 is executed by the system control circuit 121 and the image processor 117.

Referring to FIGS. 1 and 5, the system control circuit 121 starts an image-pickup driving process in order to perform image pickup driving and exposure control described with reference FIG. 4 (step S400). Subsequently, the system control circuit 121 determines the first to third accumulation time periods I to III based on a result of luminance integration of a properly exposed image, and starts an exposure control process (step S401). Then, the system control circuit 121 starts an image synthesis process for periodically synthesizing a properly exposed image, an underexposed image, and an overexposed image (step S402).

After starting the image-pickup driving process, the exposure control process, and the image synthesis process, the system control circuit 121 determines whether or not the moving image-recording switch 180 has been switched on to give an instruction for recording a moving image (moving image-recording instruction) (step S403). If a moving image-recording instruction has not been given (NO to the step S403), the system control circuit 121 goes on standby.

On the other hand, if a moving image-recording instruction has been given (YES to the step S403), the image processor 117 encodes the synthesized image and stores the encoded image in the memory section 123 as described above, and executes an image recording process for recording the synthesized image in the storage medium 133 under the control of the system control circuit 121 (step S404).

Subsequently, the system control circuit 121 determines whether or not a moving image-recording stop instruction has been given (step S405). If a moving image-recording stop instruction has not been given (NO to the step S405), the system control circuit 121 goes on standby.

If a moving image-recording stop instruction has been given (YES to the step S405), subsequently, the system control circuit 121 determines whether or not shooting of the moving image is to be terminated (step S406). If shooting of the moving image is not to be terminated (NO to the step S406), the system control circuit 121 returns to the step S403.

If shooting of the moving image is to be terminated (YES to the step S406), the system control circuit 121 executes a termination process (step S407), followed by terminating the moving image-shooting process.

Figure 6:
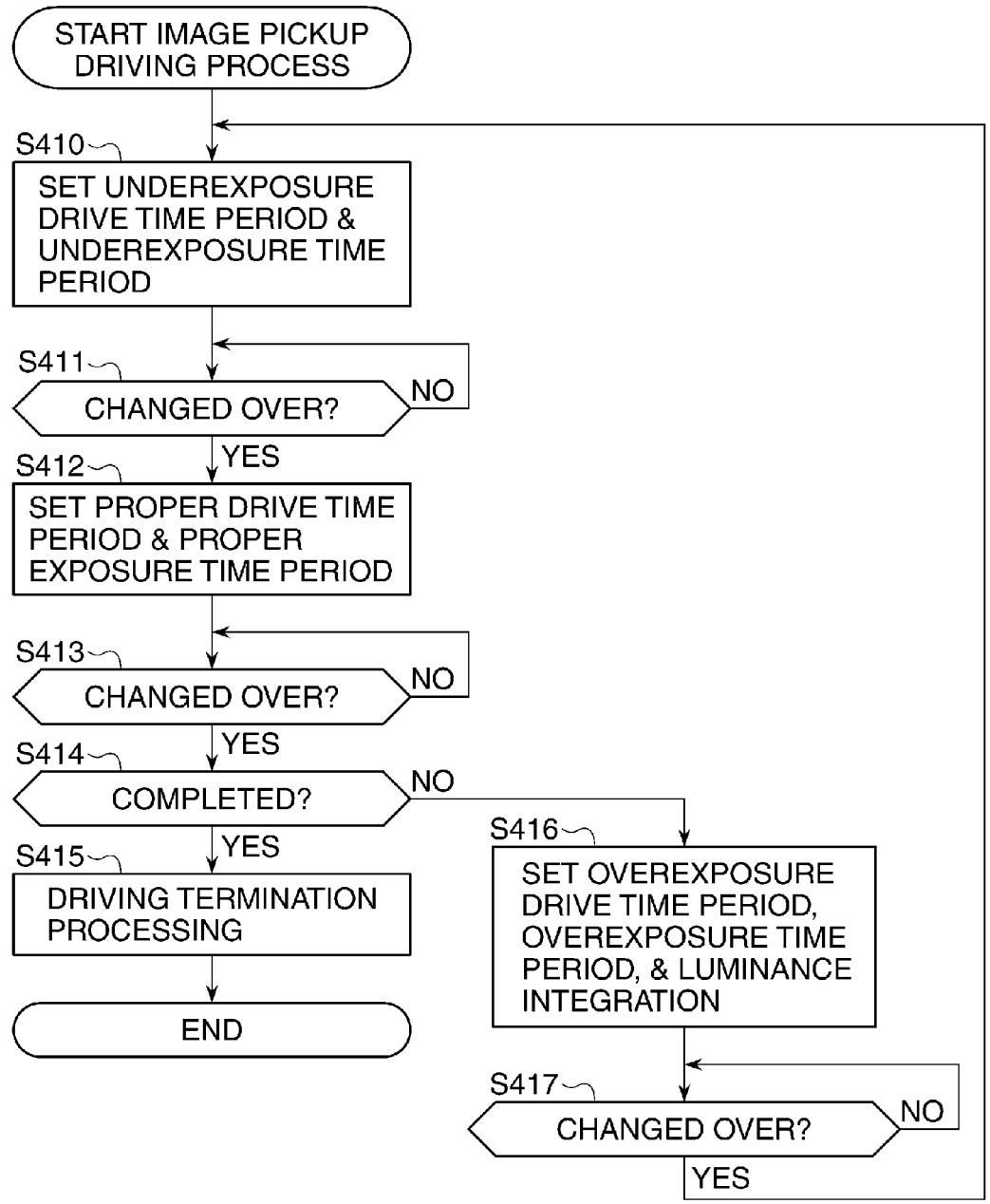
FIG. 6 is a flowchart of an image-pickup driving process in FIG. 5.

FIG. 6 is a flowchart of the image-pickup driving process shown in FIG. 5.

Referring to FIGS. 1 and 6, first, the system control circuit 121 makes a driving setting of a vertical period over which an underexposed image is accumulated (accumulation time period). At the same time, the system control circuit 121 sets a time period which causes underexposure (underexposure time period), based on an exposure control value determined in the exposure control process, described in detail hereinafter, in association with the vertical period (vertical transfer period) corresponding to the accumulation time period (step S410).

According to the settings made in the step S410, the horizontal and vertical synchronization signals output from the SSG circuit 117b of the image processor 117 are changed over, and the setting of the accumulation time period of the image pickup device 115 is changed over. The system control circuit 121 determines whether or not the above-mentioned changeover has been completed (step S411). If the changeover has not been completed (NO to the step S411), the system control circuit 121 goes on standby.

On the other hand, if the changeover has been completed (YES to the step S411), the system control circuit 121 causes the exposure controller 118 to perform an exposure operation over the vertical transfer period for underexposure, i.e. over the accumulation time period which causes the set underexposure to be obtained. At the same time, an overexposed image accumulated in the immediately preceding vertical transfer period is read out from the image pickup device 115.

Next, the system control circuit 121 makes a setting (proper exposure drive time period setting) of an accumulation time period over which a properly exposed images is accumulated. That is, the system control circuit 121 sets a time period which causes proper exposure (proper exposure time period), based on an exposure control value determined in the exposure control process, in association with the vertical period (vertical transfer period) corresponding to the accumulation time period (step S412).

According to the setting made in the step S412, the horizontal and vertical synchronization signals output from the SSG circuit 117b of the image processor 117 are changed over, and the setting of the accumulation time period of the image pickup device 115 is changed over. The system control circuit 121 determines whether or not the above-mentioned changeover has been completed (step S413). If the changeover has not been completed (NO to the step S413), the system control circuit 121 goes on standby.

On the other hand, if the changeover has been completed (YES to the step S413), the system control circuit 121 causes the exposure controller 118 to perform an exposure operation over which the vertical transfer period for proper exposure, i.e. over the accumulation time period which causes the set proper exposure to be obtained. At the same time, an underexposed image accumulated in the immediately preceding vertical transfer period is read out from the image pickup device 115.

Next, the system control circuit 121 confirms whether or not the image-pickup driving process is to be terminated (step S414). If the image-pickup driving process is to be terminated (YES to the step S414), the system control circuit 121 executes a driving termination process (step S415), followed by terminating the image-pickup driving process.

If the image-pickup driving process is not to be terminated (NO to the step S414), the system control circuit 121 makes a setting (overdrive setting) of a period over which an overexposed image is accumulated. That is, the system control circuit 121 sets a time period which causes overexposure (overexposure time period) based on an exposure control value determined in the exposure control process, in association with the vertical period (vertical transfer period) corresponding to the accumulation time period, and makes a setting of luminance integration (step S416).

According to the settings made in the step S416, the horizontal and vertical synchronization signals output from the SSG circuit 117b of the image processor 117 are changed over, and the setting of the accumulation time period of the image pickup device 115 is changed over. The system control circuit 121 determines whether or not the above-mentioned changeover has been completed (step S417). If the changeover has not been completed (NO to the step S417), the system control circuit 121 goes on standby.

On the other hand, if the changeover has been completed (YES to the step S417), the system control circuit 121 causes the exposure controller 118 to perform an exposure operation over the vertical transfer period for overexposure, i.e. over the accumulation time period which causes the set overexposure to be obtained.

At the same time, a properly exposed image accumulated in the immediately preceding vertical transfer period is read out from the image pickup device 115. Then, the luminance integration circuit 117e of the image processor 117 performs luminance integration with respect to the read properly exposed image. The system control circuit 121 returns to the step S410.

By periodically executing the above-described sequence of processing operations, the underexposed image, the properly exposed image, and the overexposed image are output from the image pickup device 115. Note that the order of readout of the underexposed image, the properly exposed image, and the overexposed image may be determined e.g. based on the characteristics of the image pickup device 115, and is not necessarily limited to the readout order shown in FIG. 6.

Figure 7:
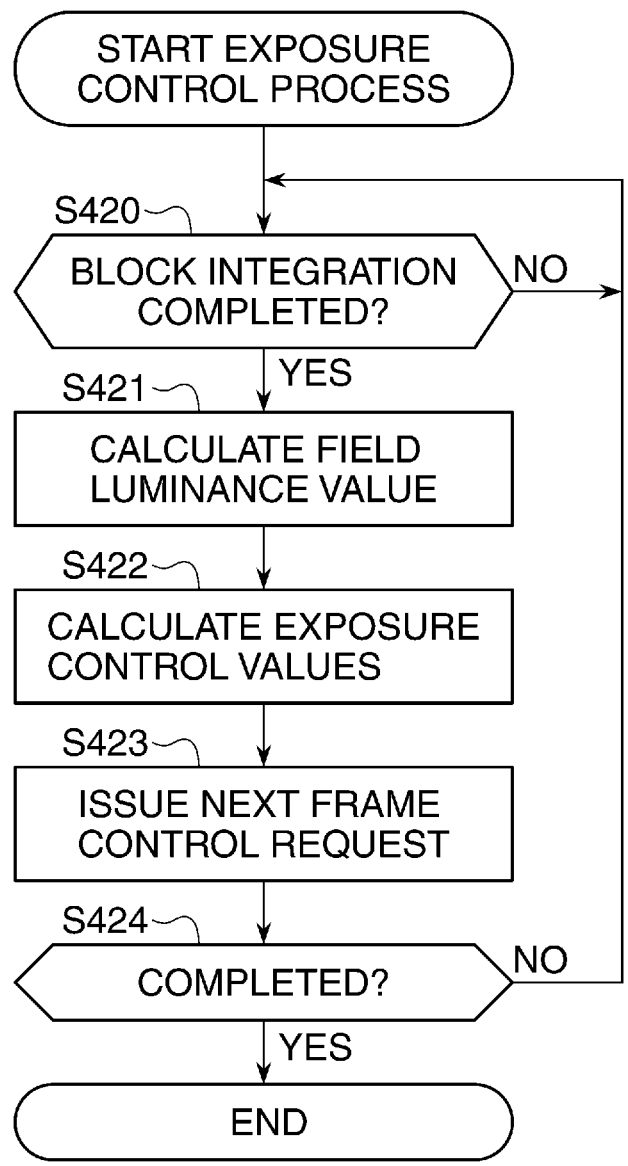
FIG. 7 is a flowchart of an exposure control process in FIG. 5.

FIG. 7 is a flowchart of the exposure control process appearing in FIG. 5.

Referring to FIGS. 1 and 7, luminance integration for photometry on the luminance of field used as a reference for the exposure control is executed on the properly exposed image at the timing described in the image-pickup driving process.

First, the system control circuit 121 determines whether or not luminance integration (block integration) has been completed (step S420). If luminance integration has not been completed (NO to the step S420), the system control circuit 121 goes on standby.

If luminance integration has been completed (YES to the step S420), the system control circuit 121 calculates a value of luminance of field (hereafter referred to as "field luminance value") based on a result of luminance integration and an exposure control value applied to the immediately preceding accumulation of the properly exposed image (step S421).

Then, the system control circuit 121 calculates an exposure control value which causes the proper exposure to be obtained, based on the field luminance value, and calculates exposure control values which cause the underexposed image and the overexposed image to be obtained (step S422).

Subsequently, the system control circuit 121 issues a control request for setting accumulation time periods for the next recording frame rate, according to the exposure control values for obtaining a properly exposed image, an underexposed image, and an overexposed image, respectively (step S423). Then, the system control circuit 121 determines whether or not the exposure control process has been completed (step S424).

If it is determined that the exposure control process has not been completed (NO to the step S424), the system control circuit 121 returns to the step S420. On the other hand, if it is determined that the exposure control process has been completed (YES to the step S424), the system control circuit 121 terminates the exposure control process.

Note that in the exposure control process, to prevent the exposure from violently changing, the luminance integration results or the exposure control values may be periodically thinned.

Figure 8:
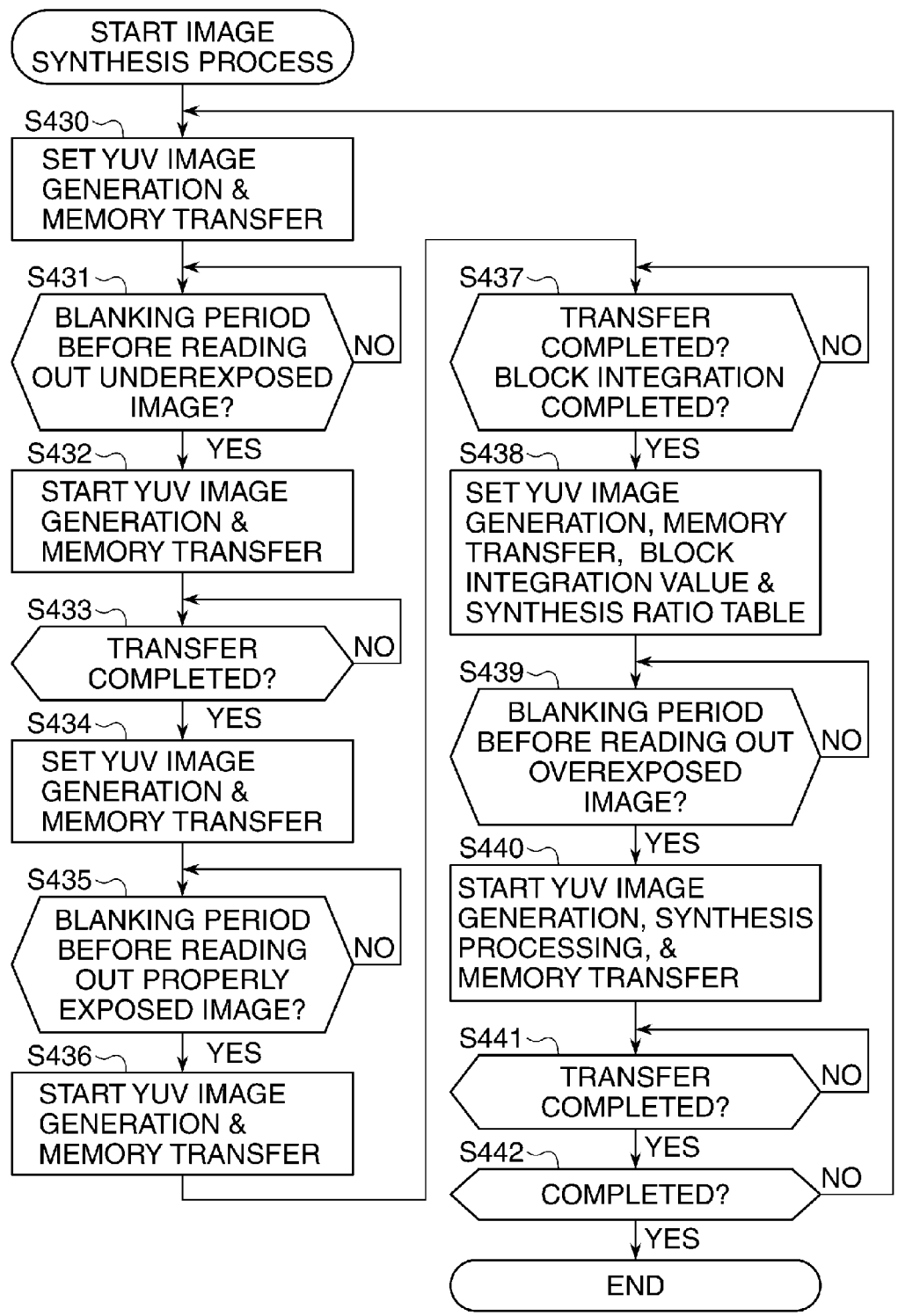
FIG. 8 is a flowchart of an image synthesis process in FIG. 5.

FIG. 8 is a flowchart of the image synthesis process shown in FIG. 5.

Referring to FIGS. 1 and 8, when the image synthesis process is started, the system control circuit 121 makes a setting for causing the image processor 117 to generate a YUV image, and a setting for causing the YUV image obtained in the image processor 117 to be transferred to the memory section 123 (step S430).

After making the settings, the system control circuit 121 determines whether or not it is during a blanking (non-image) period immediately before a vertical transfer period for readout of an underexposed image (step S431).

If it is not during a blanking period (NO to the step S431), the system control circuit 121 goes on standby. On the other hand, if it is during a blanking period (YES to the step S431), the system control circuit 121 makes settings, during the blanking period, for starting generation of a YUV image, and for permitting transfer of the YUV image (step S432).

According to these settings, when the underexposed image is read out, generation of a YUV image is started by the image processor 117, and the generated YUV image is transferred to the memory section 123.

The system control circuit 121 monitors whether or not transfer of the underexposed image (YUV image) has been completed (step S433). If the transfer of the underexposed image has not been completed (NO to the step S433), the system control circuit 121 goes on standby.

If the transfer of the underexposed image has been completed (YES to the step S433), the system control circuit 121 makes a setting for causing the image processor 117 to generate the next YUV image, and makes a setting for the YUV image generated by the image processor 117 to be transferred to the memory section 123 (step S434).

After making the settings, the system control circuit 121 determines whether or not it is during a blanking (non-image) period immediately before a vertical transfer period for readout of a properly exposed image (step S435). If it is not during a blanking period (NO to the step S435), the system control circuit 121 goes on standby.

On the other hand, if it is during a blanking period (YES to the step S435), the system control circuit 121 makes settings, during the blanking period, for starting generation of a YUV image, and for permitting transfer of the YUV image (step S436).

According to these settings, when a properly exposed image is read out from the image pickup device 115, generation of a YUV image is started by the image processor 117, and the generated YUV image is transferred to the memory section 123.

The system control circuit 121 monitors whether or not transfer of the properly exposed image (YUV image) has been completed and the block integration has been completed (step S437). If the transfer of the properly exposed images has not been completed (NO to the step S437), the system control circuit 121 goes on standby.

If the transfer of the properly exposed images has been completed (YES to the step S437), the system control circuit 121 makes a setting for causing the image processor 117 to generate the next YUV image, and a setting for transferring the YUV image generated by the image processor 117 to the memory section 123.

Further, the system control circuit 121 sets a result of block integration and a synthesis ratio table for image synthesis, in the image synthesis circuit 117g (step S438).

After the setting, the system control circuit 121 determines whether or not it is during a blanking (non-image) period immediately before a vertical transfer period for readout of an overexposed image (step S439). If it is not during a blanking period (NO to the step S439), the system control circuit 121 goes on standby.

On the other hand, if it is during a blanking period (YES to the step S439), the system control circuit 121 makes settings, during the blanking period, for starting generation of a YUV image, and for starting the synthesis process, and permitting transfer of the YUV image (step S440).

According to these settings, when an overexposed image is read out, generation of a YUV image is started by the image processor 117, and the image synthesis circuit 117g reads the underexposed image and the properly exposed image, which have been transferred to the memory section 123, in advance. Then, the image synthesis circuit 117g multiplies the underexposed image, the properly exposed image, and the overexposed image, by the synthesis ratios, respectively, on a pixel basis, and then adds up the obtained images. The image synthesis circuit 117g transfers the synthesized image to the memory section 123.

Next, the system control circuit 121 determines whether or not the transfer of the synthesized image has been completed (step S441). If the transfer of the synthesized image has not been completed (NO to the step S441), the system control circuit 121 goes on standby. On the other hand, if the transfer of the synthesized image has been completed (YES to the step S441), the system control circuit 121 determines whether or not the image synthesis has been completed (step S442).

If the image synthesis has been completed (YES to the step S442), the system control circuit 121 terminates the image synthesis process. On the other hand, if the image synthesis has not been completed (NO to the step S442), the system control circuit 121 returns to the step S430.

As described above, in the first embodiment, vertical transfer periods are made different in length based on the readout time (readout speed) of the image pickup device 115, and settings are made such that the upper limit of an accumulation time period of an image to be obtained during each vertical transfer period is changed. As a result, the accumulation time periods for an underexposed image, a properly exposed image, and an overexposed image, which are obtained during respective vertical transfer periods, are made different from each other, whereby it is possible to increase the dynamic range.

Further, in the first embodiment, also in a case where images are differentiated in brightness by gain-up of data items accumulated over the respective vertical transfer periods which are determined based on the readout time of the image pickup device 115 and limit the possible accumulation time periods, it is possible to reduce the amount of gain-up. As a result, it is possible to obtain a synthesized image on which noise components are reduced. Further, it is possible to record a moving image at a predetermined recording frame rate.

In addition, in the first embodiment, the luminance of field is measured on a properly exposed image, and the exposure control values of an underexposed image, a properly exposed image, and an overexposed image are determined according to the measured luminance of field. Then, the synthesis ratios are determined based on a result of luminance integration obtained from the properly exposed image. This makes it possible to obtain a proper synthesized image.

Next, a description will be given of an image recording device according to a second embodiment of the present invention. The configuration of a camera as an image pickup apparatus including the image recording device according to the second embodiment is the same as that shown in FIG. 1, and hence description thereof is omitted.

Figure 9:
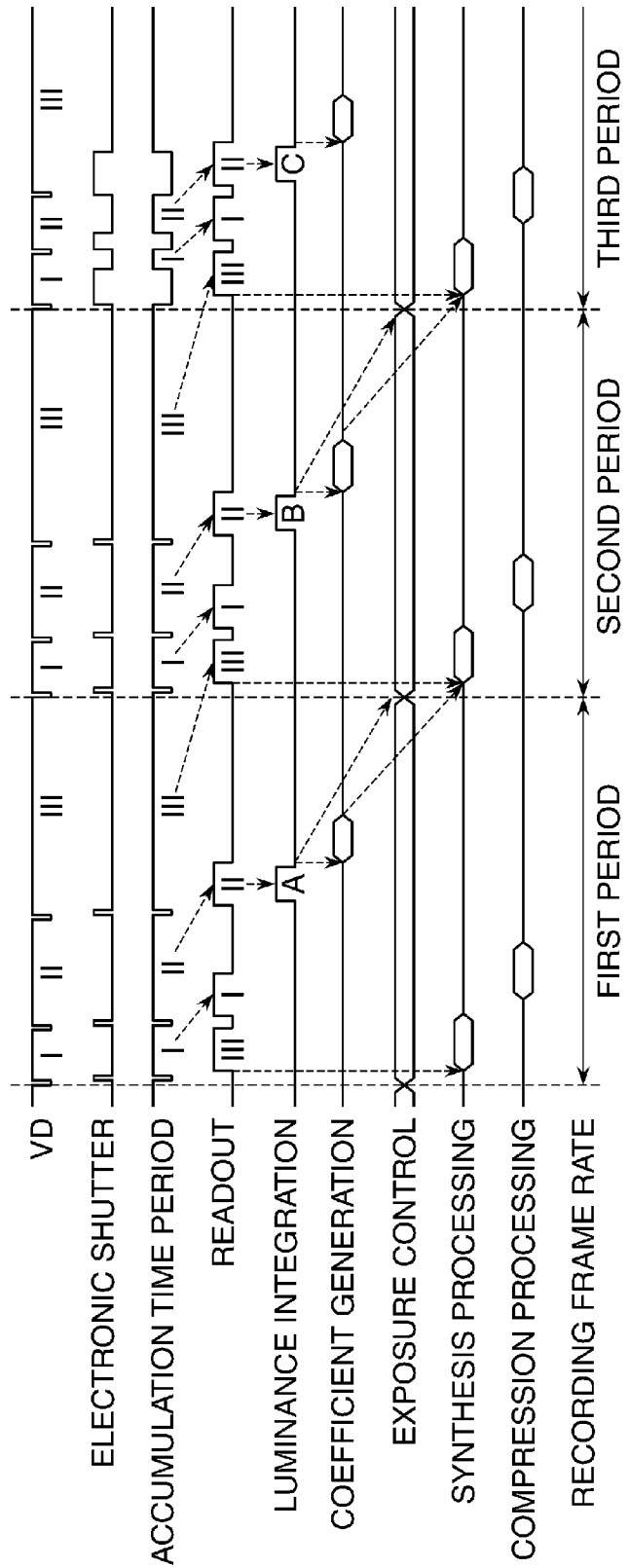
FIG. 9 is a timing diagram of image synthesis processing performed by a camera as an image pickup apparatus including an image recording device according to a second embodiment of the present invention.

FIG. 9 is a timing diagram of image synthesis processing executed by the camera in the second embodiment. Note that description of the same processing as that in FIG. 5 is omitted, and the following description will be given only of the different points.

In the example shown in FIG. 9, the shortest vertical period for driving the image pickup device 115 is determined based on the readout speed (i.e. readout time) of the image pickup device 115. Further, it is assumed that the readout speed of the image pickup device 115 is sufficiently higher than the recording frame rate of a moving image.

In the present embodiment, to increase the dynamic range of the image pickup device 115, the first to third vertical periods I to III are set as the vertical periods for image pickup driving. The first to third vertical periods I to III are each determined according to the luminance of field in the exposure control.

In doing this, the first to third vertical periods I to III are each set to be not shorter than the shortest vertical transfer period determined based on the readout time of the image pickup device 115. That is, the first to third vertical periods I to III are each determined according to an associated accumulation time period and the shortest vertical transfer period.

When an accumulation time period becomes shorter than the shortest vertical transfer period, as in the case of the third period shown in FIG. 9, the vertical transfer periods for obtaining the underexposed image and the properly exposed image are set to the shortest vertical transfer period, and the accumulation time periods are differentiated by discharging charges accumulated in the image pickup device 115 by the electronic shutter.

When an accumulation time period becomes longer than the shortest vertical transfer period, as in the cases of the first and second periods shown in FIG. 9, accumulation is performed over the entire vertical transfer period to thereby make the accumulation time period different. Further, each accumulation time period is set by the vertical transfer period and the electronic shutter, and is adjusted by the synthesis ratio with respect to an overlapping part of the dynamic range.

Figure 10:
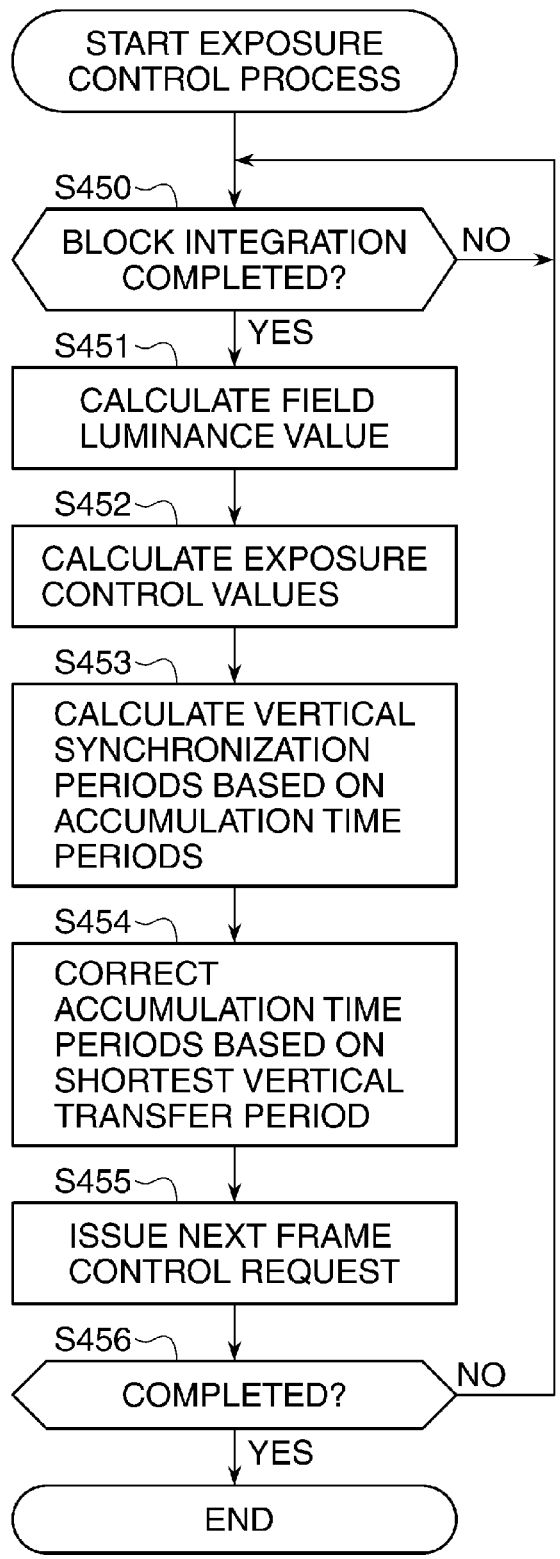
FIG. 10 is a flowchart of an exposure control process performed by the camera as the image pickup apparatus in the second embodiment.

FIG. 10 is a flowchart of an exposure control process performed by the camera in the second embodiment.

Note that in the second embodiment, the moving image-shooting process is similar to the process described with reference to the flowchart in FIG. 5, but is distinguished therefrom in the exposure control process. Further, in the present embodiment, the setting for luminance integration of the luminance of field serving as a reference of the exposure control is made with respect to the properly exposed image at the timing described in the image-pickup driving process in FIG. 6 in the first embodiment.

Referring to FIGS. 1 and 10, luminance integration for photometry on the luminance of field used as a reference for the exposure control is executed on the properly exposed image at the timing described in the image-pickup driving process.

First, the system control circuit 121 determines whether or not luminance integration (block integration) has been completed (step S450). If luminance integration has not been completed (NO to the step S450), the system control circuit 121 goes on standby.

When luminance integration has been completed (YES to the step S450), the system control circuit 121 calculates a field luminance value based on a result of luminance integration and an exposure control value applied to the immediately preceding accumulation of the properly exposed image (step S451).

Then, the system control circuit 121 calculates an exposure control value which causes the proper exposure image to be obtained, based on the field luminance value, and calculates exposure control values which causes the underexposed image and the overexposed image to be obtained (step S452).

Next, the system control circuit 121 determines vertical transfer periods over which the underexposed image, the overexposed image, and the properly exposed image are accumulated, based on the accumulation time periods, respectively (step S453). Further, the system control circuit 121 corrects the exposure control values and the accumulation time periods based on the shortest vertical transfer period based on the readout time of the image pickup apparatus 115 (step S454).

Next, the system control circuit 121 issues a control request for setting accumulation time periods for the next recording frame rate, according to the proper exposure control values for obtaining a properly exposed image, an underexposed image, and an overexposed image, respectively (step S455). Then, the system control circuit 121 determines whether or not the exposure control process has been completed (step S456).

If it is determined that the exposure control process has not been completed (NO to the step S456), the system control circuit 121 returns to the step S450. On the other hand, if it is determined that the exposure control process has been completed (YES to the step S456), the system control circuit 121 terminates the exposure control process.

Note that in the exposure control process, to prevent the exposure from violently changing, the luminance integration results or the exposure control values may be periodically thinned.

As described above, in the second embodiment, the image pickup device 115 is periodically driven over each of the first to third vertical periods (vertical transfer periods) I to III as one unit, whereby the first to third vertical periods are set such that the sum of the first to third vertical periods corresponds to a time period defined by the recording frame rate of a moving image.

Therefore, the vertical transfer periods associated with the underexposed image and the properly exposed image can be made shorter according to the luminance of field than when the vertical transfer periods are fixed. This makes it possible to maximally increase the vertical transfer period for accumulating an overexposed image, whereby it is possible to appropriately increase the dynamic range. That is, since the vertical transfer periods are caused to be changed according to the accumulation time periods determined in the exposure control process, it is possible to increase the dynamic range according to the luminance of field.

Next, a description will be given of an image recording device according to a third embodiment of the present invention. The configuration of a camera as an image pickup apparatus including the image recording device according to the third embodiment is the same as that shown in FIG. 1, and hence description thereof is omitted.

Figure 11:
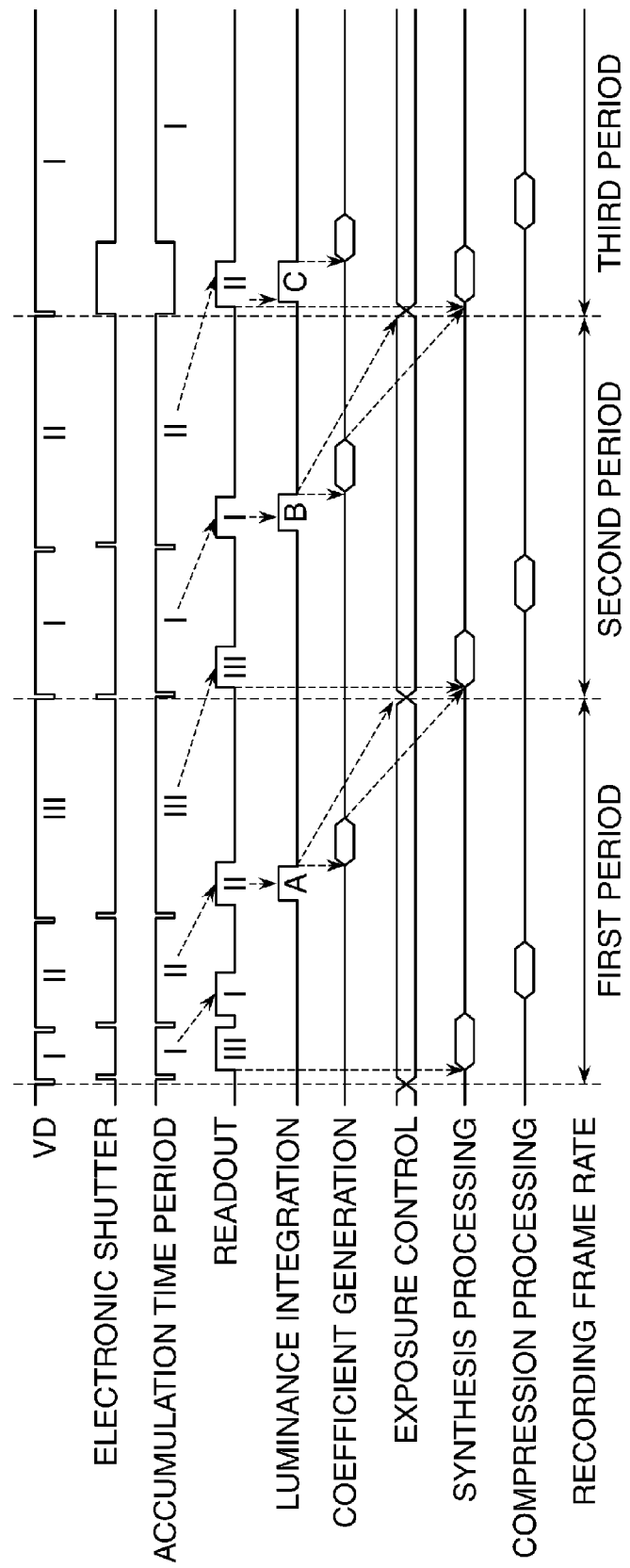
FIG. 11 is a timing diagram of image synthesis processing performed by a camera as an image pickup apparatus including an image recording device according to a third embodiment of the present invention.

FIG. 11 is a timing diagram of image synthesis processing executed by the camera in the third embodiment. Note that description of the same processing as that in FIG. 5 is omitted, and the following description will be given only of different points.

In the example shown in FIG. 11, the shortest vertical transfer period for driving the image pickup device 115 is determined based on the readout speed of the image pickup device 115. Further, it is assumed that the readout speed of the image pickup device 115 is sufficiently higher than the recording frame rate of a moving image.

In this example, to increase the dynamic range of the image pickup device 115, the number of images to be synthesized is changed according to a luminance distribution of field. Further, the vertical transfer periods in the image pickup driving are set according to the number of images to be synthesized. When the luminance distribution of field is broad, ranging from high luminance to low luminance, the number of images to be synthesized is increased, and is reduced according to the luminance distribution of field.

The first to third vertical periods I to III are each determined according to the luminance of field in the exposure control. In doing this, the first to third vertical periods I to III are each set to be not shorter than the shortest vertical transfer period determined based on the readout time of the image pickup device 115. That is, the first to third vertical periods I to III are each determined according to an associated accumulation time period and the shortest vertical transfer period.

In the example shown in FIG. 11, the luminance distribution of field is broad in the first period, and hence the number of images to be synthesized is set to three. In the second period, the luminance distribution of field is narrower than that in the first period, and hence the number of images to be synthesized is set to two.

In doing this, the first and second vertical periods I and II are each set to be not shorter than the shortest vertical transfer period determined based on the readout time of the image pickup device 115. That is, the first and second vertical periods I and II are each determined according to an associated accumulation time period and the shortest vertical transfer period.

In the third period, the luminance distribution of field is narrower than that in the second period, so that one image is output without executing synthesis processing in this period. Note that in the case of a dark scene as well, one image is output without executing synthesis processing.

In any case, the control is performed such that an image exists in which proper exposure can be obtained, and the luminance of field is calculated by integrating the properly exposed image.

When an accumulation time period is shorter than the shortest vertical transfer period, a charge accumulated in the image pickup device 115 is discharged by the electronic shutter to thereby make the accumulation time period different from others. Further, each accumulation time period is set by an associated vertical transfer period and the electronic shutter, and is adjusted by the synthesis ratio with respect to an overlapping part of the dynamic range.

In the image synthesis circuit shown in FIG. 2, in changing the number of images to be synthesized, input images are selected by a selector (not shown), and the synthesis ratio is set to zero for images which are not selected. Further, when image synthesis is not performed, a properly exposed image is selected by the selector, and the selected properly exposed image is output.

Figure 12:
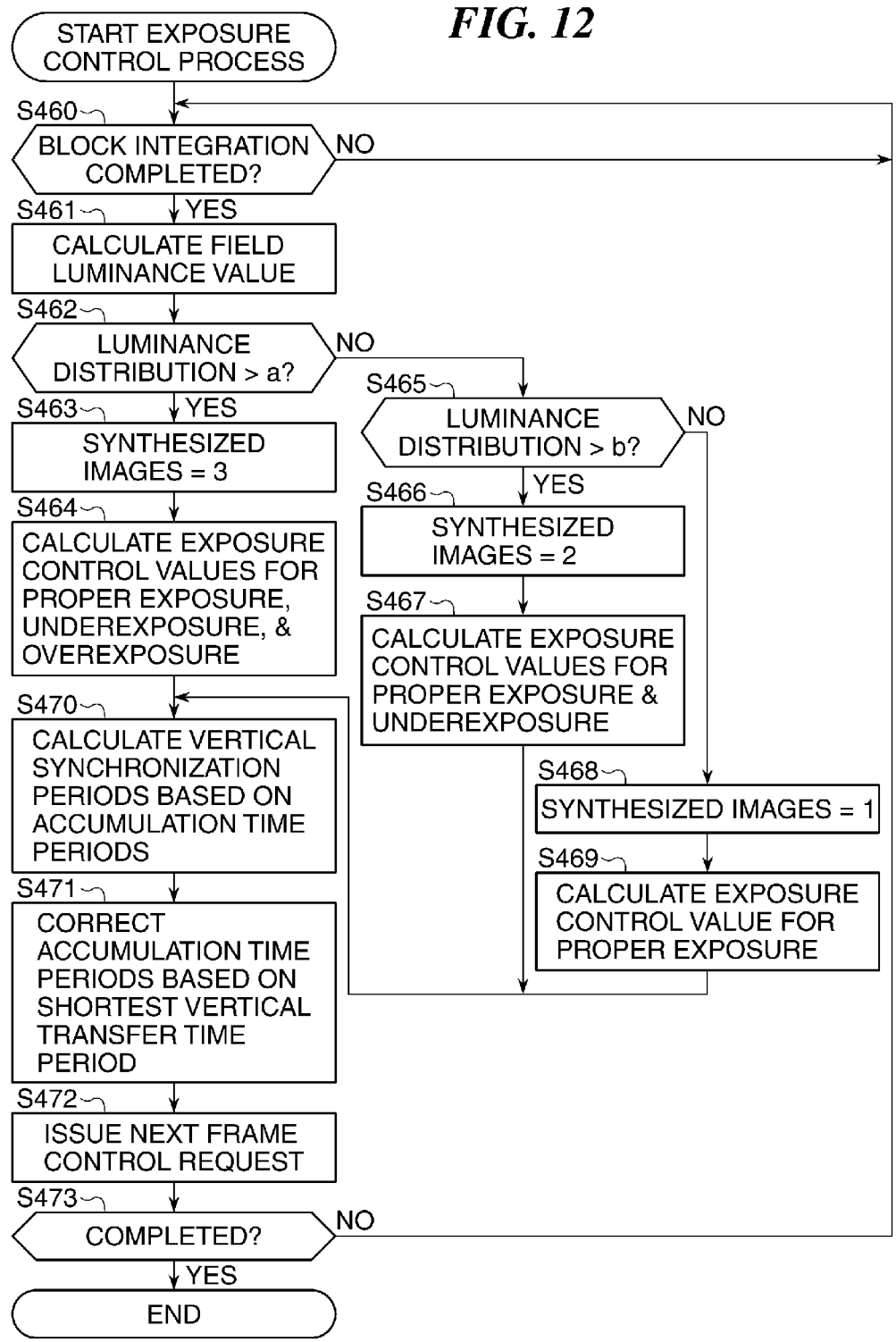
FIG. 12 is a flowchart of an exposure control process performed by the camera as the image pickup apparatus in the third embodiment.

FIG. 12 is a flowchart of an exposure control process performed by the camera in the third embodiment.

Note that the moving image-shooting process is the same as the process described with reference to the flowchart in FIG. 5. Further, in this process, luminance integration of the luminance of field as a reference of the exposure control is performed on the properly exposed image.

Referring to FIGS. 1 and 12, first, the system control circuit 121 determines whether or not luminance integration (block integration) has been completed (step S460). If luminance integration has not been completed (NO to the step S460), the system control circuit 121 goes on standby.

If luminance integration has been completed (YES to the step S460), the system control circuit 121 calculates a field luminance value based on a result of luminance integration and an exposure control value applied to the immediately preceding accumulation of the properly exposed image (step S461).

Next, the system control circuit 121 determines whether or not the luminance distribution of field generated by the signal processing circuit 117*d* is larger than a first range "a" (step S462). If the luminance distribution of field is larger than the first range "a" (YES to the step S462), the system control circuit 121 sets the number of images to be synthesized to three (step S463).

The system control circuit 121 calculates an exposure control value which causes the proper exposure image to be obtained, based on the field luminance value, and calculates exposure control values which causes the underexposed image and the overexposed image to be obtained (step S464). Then, the system control circuit 121 proceeds to a step S470, described hereinafter.

If the luminance distribution of field is not larger than the first range "a" (NO to the step S462), the system control circuit 121 determines whether or not the luminance distribution of field is larger than a second range "b" (b<a) (step S465). Then, if the luminance distribution of field is larger than the second range "b" (YES to the step S465), the system control circuit 121 sets the number of images to be synthesized to two (step S466).

The system control circuit 121 calculates an exposure control value which causes a properly exposed image to be obtained, based on the field luminance value, and calculates an exposure control value which causes an underexposed image to be obtained (step S467). Then, the system control circuit 121 proceeds to the step S470, described hereinafter.

If the luminance distribution of field is not larger than the second range "b" (NO to the step S465), the system control circuit 121 determines that image synthesis is not to be performed. That is, the system control circuit 121 sets the number of images to be synthesized to one (step S468). Then, the system control circuit 121 calculates an exposure control value which causes a properly exposed image to be obtained, based on the field luminance value (step S469), and proceeds to the step S470, described hereinafter.

Next, the system control circuit 121 determines vertical transfer periods of the frame, based on associated accumulation time periods, according to the number of images to be synthesized (step S470).

Further, the system control circuit 121 corrects the exposure control values and the accumulation time periods based on the shortest vertical transfer period determined based on the readout time (readout speed) of the image pickup device 115 (step S471).

Next, the system control circuit 121 issues a control request for setting the accumulation time periods according to the exposure control values in the next recording frame (step S472). Then, the system control circuit 121 determines whether or not the exposure control process has been completed (step S473).

If it is determined that the exposure control process has not been completed (NO to the step S473), the system control circuit 121 returns to the step S460. On the other hand, if it is determined that the exposure control process has been completed (YES to the step S473), the system control circuit 121 terminates the exposure control process.

Note that in the exposure control process, to prevent exposure from violently changing, the luminance integration results or the exposure control values may be periodically thinned.

Figure 13:
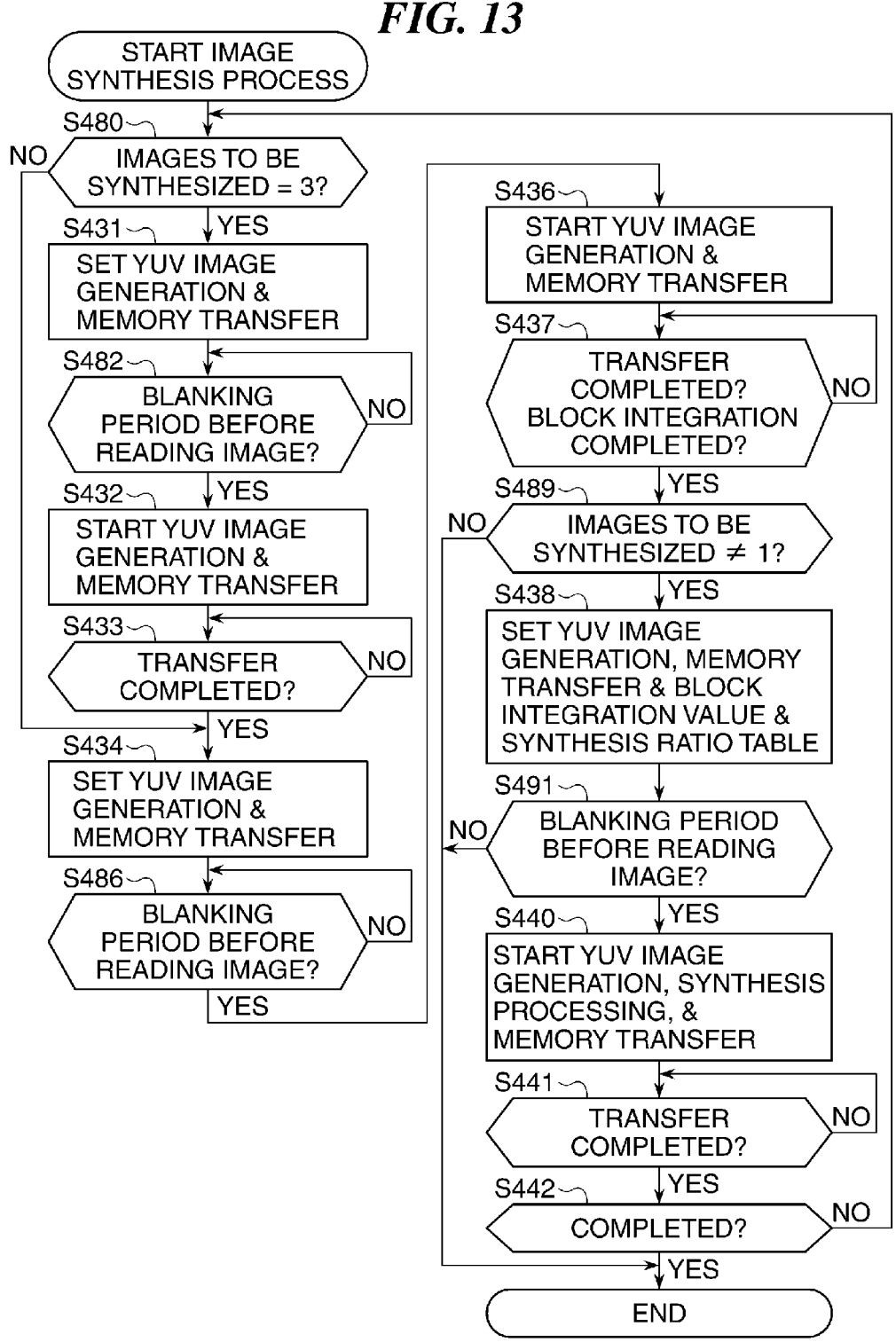
FIG. 13 is a flowchart of an image synthesis process performed by the camera as the image pickup apparatus in the third embodiment.

FIG. 13 is a flowchart of an image synthesis process performed by the camera in the third embodiment. Steps identical to those shown in FIG. 8 are denoted by the same step numbers, and description thereof is omitted.

Referring to FIGS. 1 and 13, when the image synthesis process is started, the system control circuit 121 determines whether or not the number of images to be synthesized is three (step S480). If the number of images to be synthesized is three (YES to the step S480), the system control circuit 121 executes the above-described step S431, wherein it is determined whether or not it is during a blanking (non-image) period immediately before a vertical transfer period for readout of an image (step S482).

If it is not during a blanking period (NO to the step S482), the system control circuit 121 goes on standby. On the other hand, if it is during a blanking period (YES to the step S482), the system control circuit 121 executes the above-described steps S432 to S434.

If the number of images to be synthesized is not three (NO to the step S480), the system control circuit 121 proceeds to the step S434.

Next, the system control circuit 121 determines whether or not it is during a blanking (non-image) period immediately before the vertical transfer period for readout of an image (step S486). If it is not during a blanking period (NO to the step S486), the system control circuit 121 goes on standby.

On the other hand, if it is during a blanking period (YES to the step S486), the system control circuit 121 executes the steps S436 and S437.

Next, the system control circuit 121 determines whether or not the number of images to be synthesized is not one (step S489). If the number of images to be synthesized is one (NO to the step S489), the system control circuit 121 immediately terminates the image synthesis process.

On the other hand, if the number of images to be synthesized is not one (YES to the step S489), the system control circuit 121 executes the step S438, and then determines whether or not it is during a blanking (non-image) period immediately before a vertical transfer period for readout of an image (step S491). If it is not during a blanking period (NO to the step S491), the system control circuit 121 goes on standby.

On the other hand, if it is during a blanking period (YES to the step S491), the system control circuit 121 executes the above-described steps S440 to S442.

As described above, in the third embodiment of the present invention, the vertical transfer periods at the recording frame rate are determined based on the luminance distribution of field to execute the image synthesis process. Therefore, an amount of gain-up is reduced in a case where the luminance of field is low, and the image synthesis process is executed in a case where the luminance distribution of field is broad, ranging from high luminance to low luminance, whereby it is possible to obtain an image having a wide dynamic range.

As is clear from the above description, in FIG. 1, the system control circuit 121, the timing generator 116, and the image processor 117 function as an image synthesis unit, a recording unit, and a control unit. Further, the system control circuit 121 and the image processor 117 function as a luminance distribution measurement unit or luminance of field calculation unit, and the exposure controller 118 and the system control circuit 121 function as an exposure control unit. Further, the solid image pickup device 115 functions as an image pickup unit which operates under the control of the system control circuit 121.

Note that in FIG. 1, at least the system control circuit 121, the image processor 117, and the exposure controller 118 constitute the image recording device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, an image recording device may be caused to perform a control method comprising control steps corresponding to the functions of the above-described embodiments. Further, a computer provided in the image recording device may be caused to execute a program implementing the control method. Note that the control program is stored e.g. in a computer-readable storage medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2011-209002, filed Sep. 26, 2011, which is hereby incorporated by reference herein in its entirety.

What is claimed is:
1. An image recording device comprising:
an image pickup device that accumulates charge to pick up an image of an object over different exposure levels, and outputs the accumulated charge as a plurality of image signals;
an image synthesizer that synthesizes the plurality of image signals output from the image pickup device to obtain a synthesized image;
a memory that stores the synthesized image at a predetermined frame rate; and
a controller that differentiates respective vertical periods according to the different exposure levels, and controls the sum of the vertical periods to a time period defined by the predetermined frame rate,
wherein the controller changes the vertical periods according to luminance of the object.

2. The image recording device according to claim 1, wherein the controller changes a number of the plurality of image signals to be synthesized according to the luminance of the object.

3. The image recording device according to claim 2, further comprising a signal processing circuit that measures a luminance distribution of the object, and
wherein the controller determines a number of the plurality of image signals to be synthesized according to the luminance distribution of the object measured by the signal processing circuit.

4. A method of controlling an image recording device including an image pickup device that outputs an image signal corresponding to an optical image, and a memory that records an image, the method comprising:

causing the image pickup device to accumulate charge to pick up an image of an object over different exposure levels and outputs the accumulated charge as a plurality of image signals;

synthesizing the plurality of image signals output from the image pickup device to obtain a synthesized image;

recording the synthesized image in the memory at a predetermined frame rate;

differentiating respective vertical periods according to the different exposure levels, and controlling the sum of the vertical periods to a time period defined by the predetermined frame rate; and changing the vertical periods according to luminance of the object.

5. An image pickup apparatus comprising:

an image pickup device that accumulates charges during accumulation time periods different with one another, according to a plurality of exposure levels, and outputs a plurality of image signals;

an image synthesizer that synthesizes the plurality of image signals to obtain a synthesized image, and generates a moving image at a predetermined frame rate with the synthesized image as one frame; and a controller that changes an accumulation time period according to luminance of an object, within each of a plurality of vertical periods set for each exposure level, wherein the sum of the vertical periods corresponds to a time period defined by the predetermined frame rate.

6. The image pickup apparatus according to claim 5, wherein the controller changes a number of the plurality of image signals to be synthesized according to the luminance of the object.

7. The image pickup apparatus according to claim 6, further comprising a signal processing circuit that measures a luminance distribution of the object, and wherein the controller determines a number of the plurality of image signals to be synthesized according to the luminance distribution of the object measured by the signal processing circuit.

* * * * *